United States Patent
Hofmann

[11] Patent Number: 5,842,650
[45] Date of Patent: Dec. 1, 1998

[54] METHOD AND ARRANGEMENT FOR BREAKING UP ELASTIC MATERIALS COMBINED WITH METALLIC MATERIALS

[75] Inventor: Juergen Hofmann, Salzwedel, Germany

[73] Assignee: TZN Forschungs - und Entwicklungszentrum Unterluss GmbH, Unterluss, Germany

[21] Appl. No.: 761,555

[22] Filed: Dec. 6, 1996

[30] Foreign Application Priority Data

Dec. 7, 1995 [DE] Germany .................. 195 45 580.0

[51] Int. Cl.⁶ .................................................. B02C 19/18
[52] U.S. Cl. .................................. 241/1; 241/23; 241/65; 241/301; 241/DIG. 37
[58] Field of Search .................. 241/1, 301, DIG. 37, 241/14, DIG. 31, 23, 65

[56] References Cited

U.S. PATENT DOCUMENTS

| | | |
|---|---|---|
| 3,352,503 | 11/1967 | Maroldas ..................................... 241/1 |
| 4,721,256 | 1/1988 | Lyman ............................ 241/DIG. 37 |
| 4,821,729 | 4/1989 | Makofski et al. . | |
| 5,220,913 | 6/1993 | Horbal et al. . | |

FOREIGN PATENT DOCUMENTS

| | | | |
|---|---|---|---|
| 228296 | 5/1960 | Australia ..................................... 241/1 |
| 704073 | 2/1965 | Canada ....................................... 241/1 |
| 2.050.752 | 4/1971 | France . | |
| 31 03 311 A1 | 12/1981 | Germany . | |
| 4339158A1 | 5/1995 | Germany . | |
| 406055093 | 3/1994 | Japan ............................. 241/DIG. 37 |
| 1538929 | 1/1990 | U.S.S.R. ..................................... 241/1 |
| 2070623 | 9/1981 | United Kingdom ........... 241/DIG. 37 |
| 2120579 | 12/1983 | United Kingdom ........................ 241/1 |

OTHER PUBLICATIONS

Linke, Dr. G. Entwicklungsstand der elektro–hydraulischen Zerkleinerung, Chenie–Ing.–Tech. 40 Jahrg. 1968, pp. 117–120.

*Primary Examiner*—Mark Rosenbaum
*Attorney, Agent, or Firm*—Spencer & Frank

[57] ABSTRACT

A method and an arrangement are provided for breaking up composite material comprised of elastic materials combined with metallic materials. The composite material is placed into an insulated vat holding liquid nitrogen via a transporting device and is positioned below a unipolar electrode arrangement. An energy source generates high-energy pulses that are applied to the composite material by the electrode arrangement. The composite material is torn apart by the high-energy pulses and is separated by a subsequently resulting pressure pulse.

7 Claims, 2 Drawing Sheets

METHOD AND ARRANGEMENT FOR BREAKING UP ELASTIC MATERIALS COMBINED WITH METALLIC MATERIALS

CROSS-REFERENCE TO RELATED APPLICATIONS

The right of priority is claimed herein with respect to German application No. 195 45 580 filed in Germany on Dec. 7, 1995, the disclosure of which is incorporated herein by reference.

BACKGROUND OF THE INVENTION

The invention relates to a method for breaking up elastic materials that are combined with metallic materials as composite materials and an arrangement for carrying out this method.

It is known to break up a composite material composed of elastic materials and metallic materials with impact crushers that crush the composite material through acceleration and impact and, as a side effect, cause it to break up. The cooling of the material to be broken up also cools the crusher with the result that the subsequently occurring acceleration forces also disintegrate parts of the crusher. This results in high costs for material wear and tear and repair operations.

German patent document DE-OS 43 39 158, discloses a method for separating metals out of dry mixtures that include metallic components and inorganic and/or organic components. In this case, the mixtures are subjected to a crushing treatment and to additional shearing and frictional forces. The organic and inorganic components are crushed during this process and the metallic constituents are elastically deformed. The metallic component parts are removed by screening them out of the remaining components. The disadvantage of this method is reflected in the high processing and installation costs.

SUMMARY OF THE INVENTION

It is an object of the invention to provide a time and cost effective method for breaking up elastic materials combined with metallic materials and to provide an arrangement for carrying out this method.

The above and other objects are accomplished according to the invention by the provision of a method for breaking up composite material composed of elastic materials combined with metallic materials, including the steps of: placing the composite material into a vat with liquid nitrogen, with the use of a transporting device, for making the composite material brittle; generating high-energy pulses from an energy source; applying, with an electrode arrangement, the high-energy pulses to the brittle composite material in the vat to tear the brittle composite material apart; and separating the metallic material from the elastic material by pressure pulses that result from the high-energy pulses.

According to a further aspect of the invention there is provided an arrangement for breaking up composite material composed of elastic materials combined with metallic materials, including: a vat for holding liquid nitrogen; a transporting device for carrying the composite material into the vat with the liquid nitrogen therein; an electrode arrangement mounted in the vat so as to be positioned above the composite material transported into the vat; and a high-energy source coupled to the electrode arrangement for generating high-energy pulses that are applied to the composite material by the electrode arrangement for breaking up the composite material in the vat.

The many operational steps required by the prior art methods are advantageously eliminated through the use of high-energy pulses in accordance with the invention. With the aid of the method and arrangement of the invention, it is possible to break up and separate composite plastic/metal materials with flat and/or round shapes as well as rubber/metal materials with flat and/or round shapes and consisting of different plastic and/or rubber materials. For example, the method of the invention may be used to break up and separate non-vulcanized rubber from steel wires, plastic or rubber from metal profiles or metal wire gauze.

Thus, even large composite materials can be broken up through the movable guide for the electrode arrangement. Another advantage is offered by the multiple electrode arrangement, so that larger composite materials can be broken up simultaneously, which results in a further time saving.

The invention is explained in more detail below in conjunction with the accompanying drawing.

DETAILED DESCRIPTION OF THE INVENTION

Figure 1:
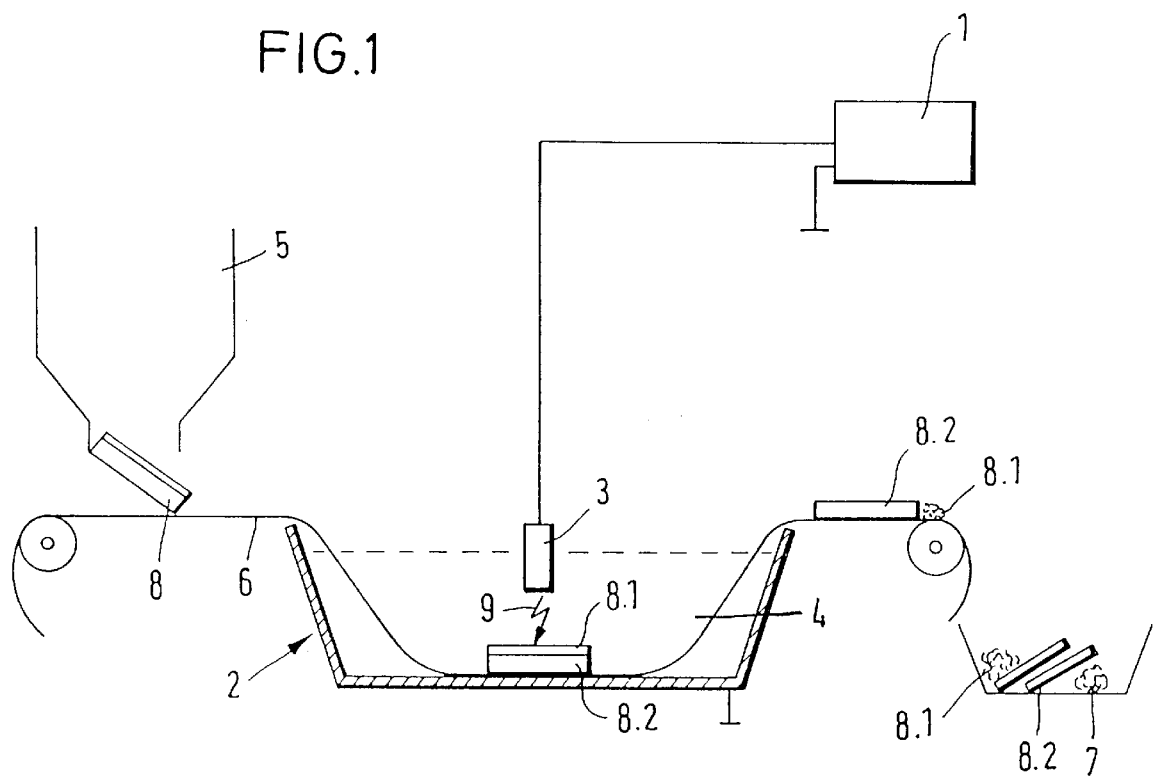
FIG. 1 is a schematic side view in partial section showing an electrode arrangement for a material to be processed according to the method of the invention.

Referring to FIG. 1, there is shown an insulated vat 2 for receiving liquid nitrogen 4. In this case, insulated vat 2 preferably has a bottom made of stainless steel and an outer insulation (not shown) constituted by a cold and electrical insulating layer. Inserted into vat 2 is a preferably unipolar electrode arrangement 3, which is connected to an energy source 1 for generating high-energy pulses 9. Vat 2 is connected as a ground electrode for electrode arrangement 3. Thus, an electrical connection is established between energy source 1 and insulated vat 2.

A storage container 5 holding composite material 8 that is to be broken up, is arranged above a transporting device 6 made of special steel, which is immune against cold and high-energy and pressure pulses. Composite material 8 is composed of an elastic material 8.1, for example rubber or plastic combined with a metallic material 8.2, for example steel or brass. At the end of transporting device 6 is a receiving container 7 for receiving the broken up materials 8.1 and 8.2.

In order to avoid high-voltage injuries, vat 2 and electrode arrangement 3 are preferably housed in a casing that is not shown here for reasons of clarity. This casing has openings for transporting device 6 with composite material 8 and broken up materials 8.1 and 8.2.

The operational sequence of the method is as follows. Composite material 8 to be broken up is moved from storage container 5 to transporting device 6. For a larger composite material 8, it is preferable if the metallic material component 8.2 lies on transporting device 6 and the elastic material component 8.1 points toward electrode arrangement 3. Transporting device 6 subsequently is submerged in vat 2 with liquid nitrogen 4 where composite material 8 become brittle at approximately −195° C. As a result of becoming brittle, the points of discontinuity existing in composite material 8 become more prominent. While in liquid nitrogen 4, composite material 8 is moved below unipolar electrode arrangement 3. There, brittle composite material 8 is penetrated by high-power pulses 9 generally produced by energy source 1 and is broken up. In this case, vat 2 functions as a ground electrode and backplate to electrode arrangement 3. The penetration of high-energy pulse 9, which is discharged from unipolar electrode arrangement 3 toward insulated vat 2, tears composite material 8 apart at the locations of the brittle material discontinuities during a first step on transporting device 6. In a second step, the following pressure pulse, which is caused by high-energy pulse 9, separates the individual material components 8.1 and 8.2 at the torn places. In this case, one layer becomes more dense in the liquid nitrogen, and the pressure of the more dense layer acts upon the already torn-apart material components 8.1 and 8.2.

The parameters of high-energy pulses 9 are varied depending on the specific composite material 8 to be broken up.

Generally speaking, the voltage is 50 to 250 kV, the current is 10–100 kA, and the energy is 200 to 1200 J per pulse. A pressure maximum of 50 to 600 bar as well as a pressure interval of 10 to 50 $\mu s$ are sufficient to separate, for example, tank track links into constituent components of steel and rubber. A pulse repetition rate generally is up to 10 Hz, meaning 10 pulses per second and is determined by composite material 8 to be broken up as well as the break-up requirements.

The broken-up materials 8.1 and 8.2 are transported on transporting device 6 from vat 2 to a receiving container 7, from which they can be removed individually.

Figure 2:
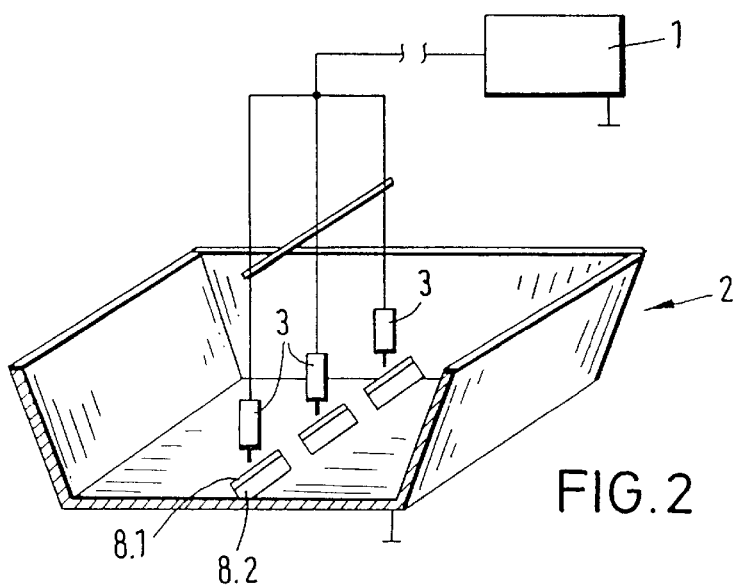
FIG. 2 is a schematic perspective view in partial section of a multiple electrode arrangement according to another embodiment of the invention.

It is understood that the invention is not limited to the embodiment shown, but also permits changes within the framework of the broader scope of the invention defined in the claims. For example, FIG. 2 shows that several of unipolar electrode arrangements 3 can be arranged simultaneously in vat 2. Also, a flexible adjustment via the composite material 8 to be processed is possible. In place of unipolar electrode arrangement 3, a traditional electrode arrangement, either encapsulated or not encapsulated, can be used as well. However, this requires higher parameters for the high-energy pulse 9.

Figure 3:
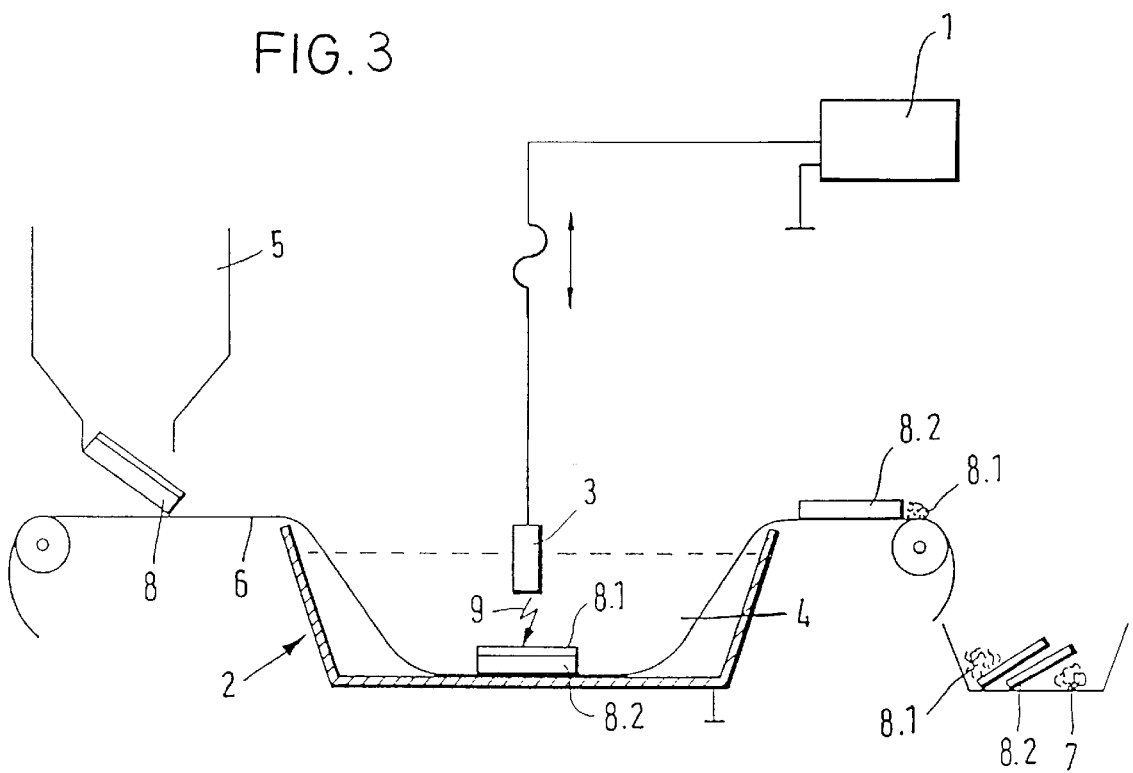
FIG. 3 is a schematic side view as shown in FIG. 1 with a movably guiding of the electrode arrangement.

The flexible adjustability of the electrode arrangement with respect to the composite material 8 to be processed is shown in FIG. 3. With the aid of a movable conductor (cable) between the energy supply 1 and the electrode arrangement 3, the adjustability is achieved by means of conventional electrode positioning units, for example linear controlled robot shafts forming a 3-shaft displacement unit.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A method for breaking up composite material composed of elastic materials combined with metallic materials, including the steps of:

placing the composite material into a vat with liquid nitrogen, with the use of a transporting device, for making the composite material brittle;

generating high-energy pulses, with 200 to 1200J per pulse, from an energy source;

applying, with an electrode arrangement, the high-energy pulses to the brittle composite material in the vat to tear the brittle composite material apart; and separating the metallic material from the elastic material by pressure pulses that result from the high-energy pulses.

2. The method according to claim 1, wherein the applying step includes movably guiding the electrode arrangement over the composite material.

3. An arrangement for breaking up composite material composed of elastic materials combined with metallic materials, including:

a vat for holding liquid nitrogen;

a transporting device for carrying the composite material into the vat with the liquid nitrogen therein;

an electrode arrangement mounted in the vat so as to be positioned above the composite material transported into the vat; and a high-energy source coupled to the electrode arrangement for generating high-energy pulses, with 200 to 1200 J per pulse, that are applied to the composite material by the electrode arrangement for breaking up the composite material in the vat.

4. The arrangement according to claim 3, wherein the electrode arrangement comprises a unipolar electrode arrangement and the vat includes cold and electrical insulation and is arranged as a ground electrode for the unipolar electrode arrangement.

5. The arrangement according to claim 3, wherein the electrode arrangement is movably arranged above the composite material in the vat.

6. The arrangement according to claim 3, wherein the electrode arrangement comprises a multiple electrode arranged in the vat.

7. The arrangement according to claim 3, further comprising means for transporting broken up composite material from the vat to a container.

* * * * *